United States Patent [19]

Kadowaki et al.

[11] Patent Number: 4,812,900
[45] Date of Patent: Mar. 14, 1989

[54] ORIGINAL READING APPARATUS WITH LIGHT SOURCE SWITCHING WITHOUT A SWITCHING CIRCUIT

[75] Inventors: Hidejiro Kadowaki; Akihito Hosaka, both of Yokohama; Kenichi Matsumoto, Tokyo, all of Japan

[73] Assignee: Canon Kabushiki Kaisha, Tokyo, Japan

[21] Appl. No.: 919,378

[22] Filed: Oct. 16, 1986

[30] Foreign Application Priority Data

Oct. 17, 1985 [JP] Japan ................. 60-229894

[51] Int. Cl.⁴ .................................................. H04N 1/46
[52] U.S. Cl. ........................................ 358/75; 358/41; 355/37
[58] Field of Search ................. 358/41, 43, 44, 75–80; 355/4, 35, 37

[56] References Cited

U.S. PATENT DOCUMENTS

| | | | |
|---|---|---|---|
| 4,264,921 | 4/1981 | Pennington et al. | 358/50 |
| 4,318,122 | 3/1982 | White | 358/41 |
| 4,642,679 | 2/1987 | Nagano | 358/80 |
| 4,658,289 | 4/1987 | Nagano et al. | 358/75 |
| 4,670,779 | 6/1987 | Nagano | 358/75 |

*Primary Examiner*—James J. Groody
*Assistant Examiner*—Robert M. Bauer
*Attorney, Agent, or Firm*—Fitzpatrick, Cella, Harper & Scinto

[57] ABSTRACT

An original reading apparatus includes: a line sensor having first and second sensor arrays each composed of a plurality of light receiving elements; a first optical filter disposed on the light incident side of the first sensor array; a second optical filter disposed on the light incident side of the second sensor array, the second optical filter being complementary in color to the first optical filter; a first light source which turns on and off during one line scan of an original; a second light source which is continually turned on until an original scanning is completed.

5 Claims, 5 Drawing Sheets

ORIGINAL READING APPARATUS WITH LIGHT SOURCE SWITCHING WITHOUT A SWITCHING CIRCUIT

BACKGROUND OF THE INVENTION

1. Field of the Invention

The present invention relates to an apparatus for reading an original, and more particularly to an original reading apparatus which can read a color original at high speed.

2. Related Background Art

There is known an original reading method. With this method, the surface of an original is scanned by a line sensor to read it.

FIGS. 1 and 2 are schematic circuit diagrams showing monochromatic line sensors. In the circuit shown in FIG. 1, signals outputted from a photodiode array composed of a plurality of light receiving elements or photodiodes, are inputted to input ports 103a of a CCD analog shift register 103 via switching transistors 102 which are turned on by a transfer signal 101. The signals inputted to the CCD analog shift register 103 are picked up as a video signal from a video signal output terminal 105, in real time in response to a clock signal 104.

In the circuit shown in FIG. 2, signals outputted from a photodiode array 100 are picked up as a video signal from a video signal output terminal 107, in real time in response to a clock signal 104 applied to a digital shift register 106 which turns on switching transistors 106.

Three color signals including red, green and blue can be read by scanning an original with these line sensors. Methods of reading three color signals are: (1) for example, a line sequential method in which a monochromatic line sensor as shown in FIGS. 1 and 2 is used to read a line of an original while the color of light applied to it is changed; (2) a method in which an original is read by providing red, green and blue filters on the light incident side of a line sensor, as shown in FIG. (3), and (3) a method in which an original is read by using three line sensors provided with red, green and blue filters 111, 112, and 113, respectively, as shown in FIG. 4.

With the line sequential method, however, the color of light must be changed for reading each line of an original. For example, when an original is read at a resolution of 400 dpi (dot/inch) and at a scan speed of 60 mm/sec, the light switching time becomes about 0.35 m sec for each dot. Further, it is necessary to use a light source which has no afterglow and can be switched at high speed. For such a light source, a light emitting diode (LED) has been used heretofore. However, a light emitting diode cannot radiate blue color light sufficiently, and therefore a fluorescent lamp has been used for blue color light. Use of a fluorescent lamp necessitates a high speed switching circuit and the like to speed up a response time of the lamp. As such, the line sequential method operated at high speed requires additional circuits, resulting in a high cost of the apparatus.

With the method shown in FIG. 3, the width of a photodiode element becomes about one third of the element pitch. Therefore, in case of a so-called contact type line sensor disposed in contact with or adjacent an original and having a resolution of 400 dpi, the width of a light receiving element of the line sensor becomes smaller than 20 micron. Therefore, an elongated line sensor is difficult to manufacture.

With the method shown in FIG. 4 using three photodiode arrays, the drawback occurs that a picking up the output of the second array is difficult because of the problem of an arrangement of the line sensor.

SUMMARY OF THE INVENTION

The present invention has been made in view of the above problems, and it is an object of the present invention to provide an original reading apparatus of a simple construction which can read an original at high speed without using a switching circuit and the like for switching a light source at high speed.

It is another object of the present invention provided a color original reading apparatus for reading an original by using a line sensor composed of light receiving elements, wherein the line sensor is constructed of a first filter disposed on a first row and a second filter complementary in color to the first filter and disposed on a second row, and either one of colored lights passing through the first and second filters respectively is applied to the original to read it.

DETAILED DESCRIPTION OF THE PREFERRED EMBODIMENTS

The preferred embodiments of the color original reading apparatus of this invention will now be described with reference to the accompanying drawings.

Figure 1:
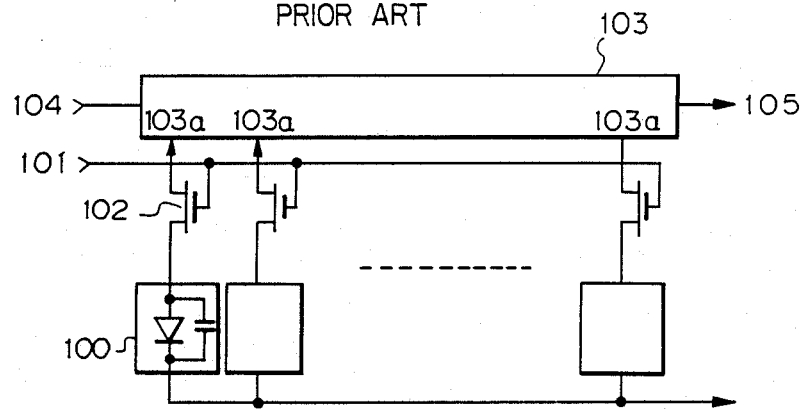
FIGS. 1 and 2 are schematic circuit diagrams showing conventional line sensors.
Figure 2:
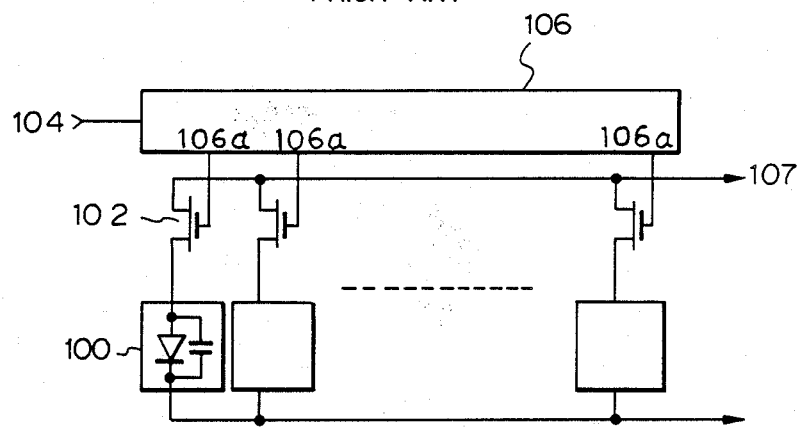
Figure 3:
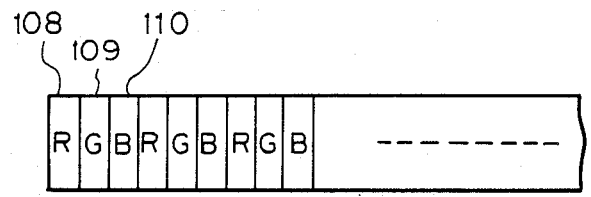
FIGS. 3 and 4 show the arrangements of red, green and blue filters on line sensors.
Figure 4:
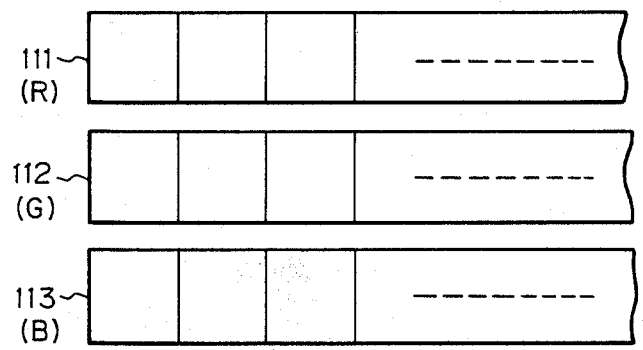
Figure 5:
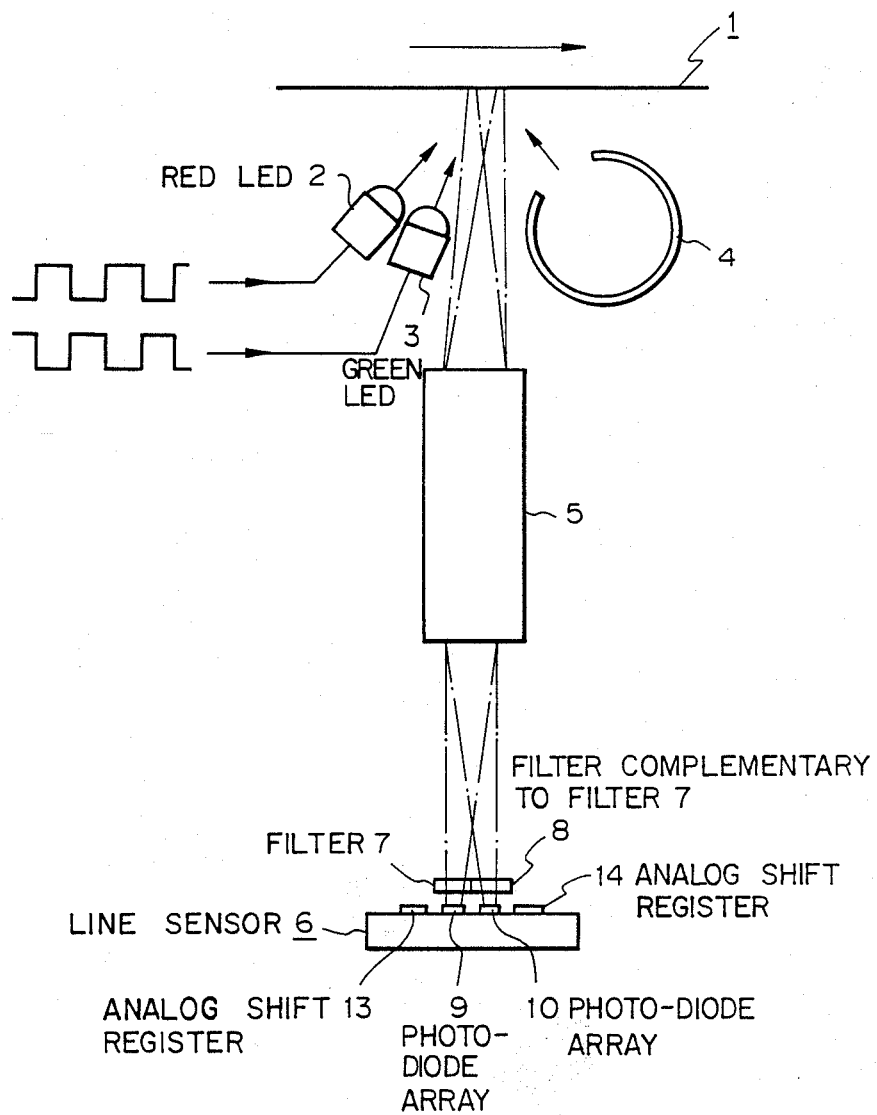
FIG. 5 shows the arrangement of a color original reading apparatus according to the present invention.

FIG. 5 shows the arrangement of a color original reading apparatus according to a first embodiment of the present invention.

In the figure, light from a read LED 2, green LED 3 and blue fluorescent lamp 4 is applied to a color original 1 and focussed on a line sensor 6 via an optical system such as a lens array 5.

Figure 6:
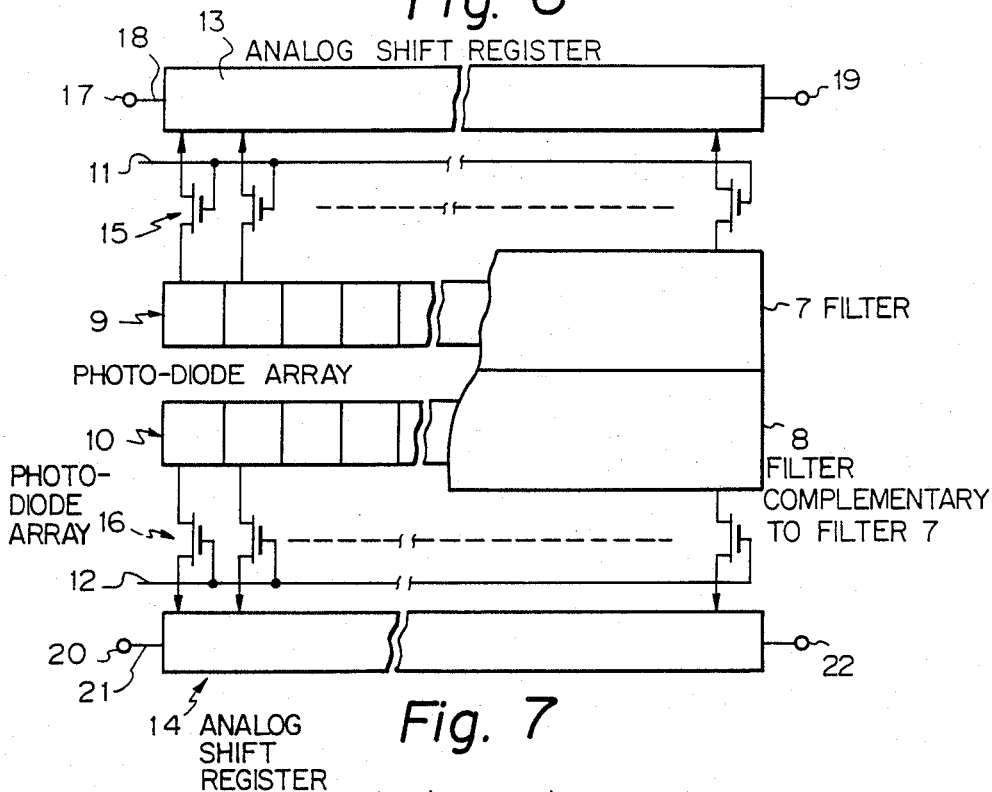
FIG. 6 shows the arrangement of the line sensor used with the apparatus.

The blue fluorescent lamp 4 is continuously illuminated until the original is completely read, while the LEDs 2 and 3 are alternately illuminated after one line is read. The line sensor 6 is constructed as shown in FIG. 6. In particular, photodiode arrays 9 and 10 are disposed having on their surfaces two subtractive complementary color filters, e.g., yellow and blue filters 7 and 8.

Outside the photodiode arrays and 10, are disposed the output sides of photodiode elements constituting the photodiode arrays 9 and 10, and switching transistor arrays 15 and 16 for transferring in parallel the outputs of the photodiode arrays 9 and 10 to CCD analog shift registers 13 and 14 in response to transfer signals 11 and 12.

The output signals from the photodiode arrays 9 and 10 are supplied in parallel to the CCD analog shift register 13 to output a video signal from video signal output terminals 19 and 22.

Figure 7:
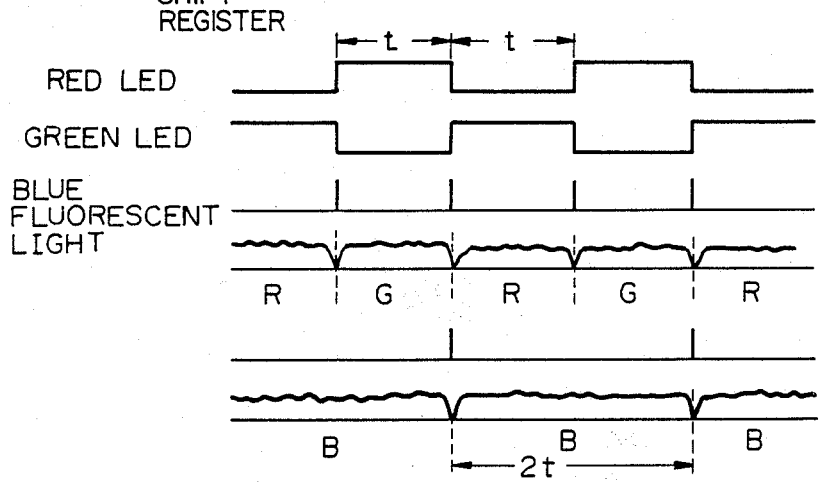
FIG. 7 shows the timings of turning on and off the red LED, green LED and fluorescent lamp, and the waveforms obtained by the line sensor.

The photodiode array 9 with the yellow filter 7 can detect only red and green information. Therefore, as shown in FIG. 7, while the red LED 2 is illuminated, red information charge is stored in the photodiode array 9. The signal corresponding to the stored charge is transferred to the CCD analog shift register 13 in response to the transfer signal 11. Before the green LED 3 is illuminated next, a clock signal 18 is applied to a clock terminal 17 of the CCD analog shift register 13, so that a red video signal is outputted from a video signal output terminal 19. Similarly, a green video signal can be detected by illuminating the green LED 3.

Thus, red and green video signals are outputted from the video signal output terminal 19 one line after another.

The photodiode array 10 with the blue filter 8 can detect only blue information on an original which is illuminated continuously by the blue fluorescent lamp 4. The periods of the transfer signal 12 and clock signal 21 are made twice as long as those of the transfer signal 11 and clock signal 18. Therefore, every time the red and green video signals for one line are read, a blue video signal is read. In this case, the line sensor generally has a relatively poor sensitivity in reading blue information as compared with that displayed in reading red or green information, so that the time required for reading blue information is preferably set to be longer.

In the above embodiment, the line sensor 6 is constructed of two photodiode arrays 9 and 10 as described reference with FIGS. 5 and 6, thus resulting in a simple construction of the sensor. Further, since blue light to which the sensor is least sensitive, is continuously provided for illumination a color original can be read without using a light source of large power.

Figure 8:
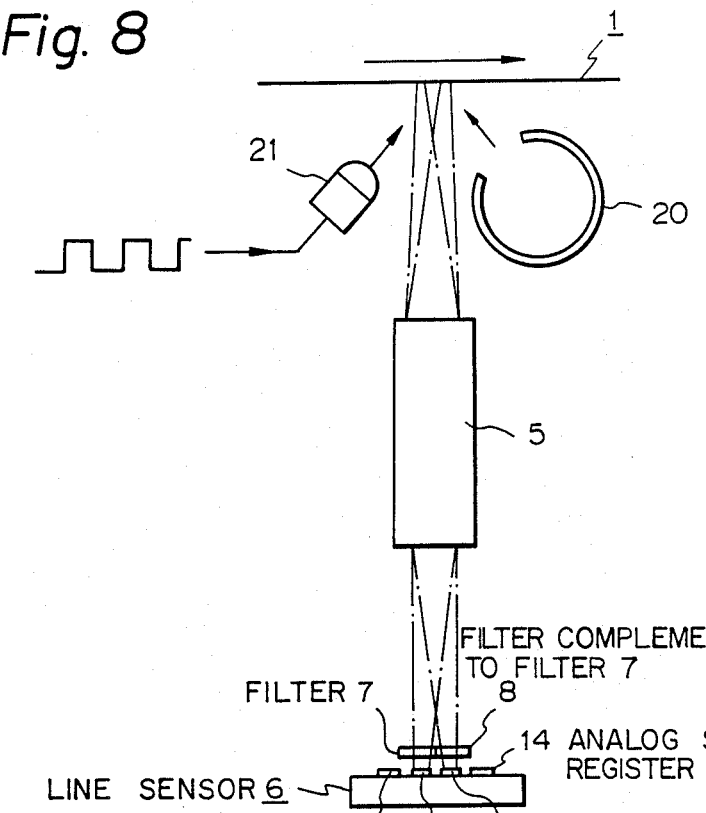
FIG. 8 shows the arrangement of a color original reading apparatus according to another preferred embodiment of the invention.

Next, another embodiment will be described with reference to FIG. 8, showing the arrangement of this embodiment of the color original reading apparatus of this invention.

Figure 9:
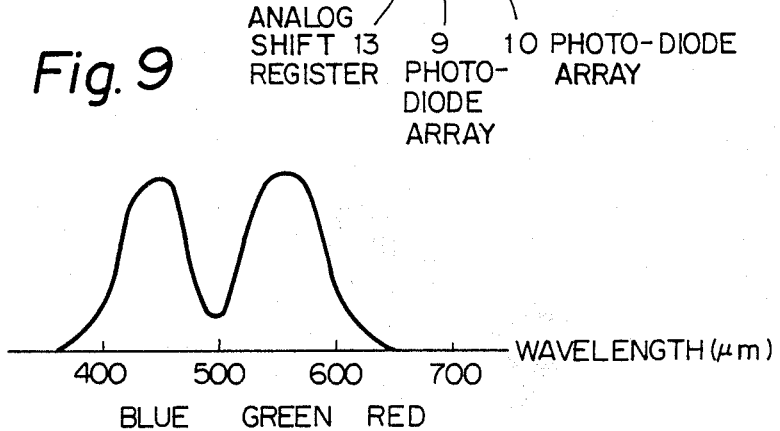
FIG. 9 is a light spectrum of a cyan fluorescent lamp which has peaks at blue and green.

In this embodiment, to obtain an excellent color separation, a cyan fluorescent lamp 20 having peaks at blue and green as shown in FIG. 9, is continuously illuminated. As a light source turning on and off for each line, only the red LED 21 is used. The line sensor 6 has the same construction as that of the first embodiment shown in FIG. 6.

From the video signal output terminal 19, a green video signal and a video signal composed of green and red video signals are outputted alternately for each line. From the video signal output line 22, a blue video signal is outputted similarly to the first embodiment. The red video signal can be produced by subtracting a green signal component from the video signal composed of green and red video signals.

In the case where a green LED is used instead of the red LED 21, a fluorescent lamp 20 having peaks at red and blue is used to read an original.

It is not necessary, according to the invention, to use exactly three light sources and filters, nor to use elements similar to those described above, but any other combinations may be used which afford the as effect as above.

As described in the foregoing, the present invention provides a color original reading apparatus for reading an original by using a line sensor composed of light receiving elements, wherein the line sensor is constructed of a first filter disposed on first row and a second filter complementary in color to the first filter and disposed on a second row, and either one of colored lights passing through the first and second filters respectively is applied to the original to read it. Therefore, a high speed reading of an original is possible with a simple construction and without using a switching circuit and the like for switching a light source at high speed. Further, problems associated with packaging density can be solved, thereby enabling manufacture of the apparatus to be done easily.

We claim:

1. An original reading apparatus comprising:
    a line sensor having first and second sensor arrays each composed of a plurality of light receiving elements;
    a first optical filter disposed on the light incident side of said first sensor array;
    a second optical filter disposed on the light incident side of said second sensor array, said second optical filter being complementary in color to said first optical filter;
    a first light source which, alternatingly, on and off during line scans of an original so that the light is alternatively on or off for succeeding line scans; and
    a second light source which continues to be turned on until an original scanning is completed.

2. An original reading apparatus according to claim 1, wherein said light receiving elements are photodiodes.

3. An original reading apparatus according to claim 1, wherein said first light source is an LED.

4. An original reading apparatus according to claim 1, wherein said second light source is a fluorescent lamp.

5. An original reading apparatus according to claim 1, wherein said first light source includes a rad LED and a green LED.

* * * * *

UNITED STATES PATENT AND TRADEMARK OFFICE
CERTIFICATE OF CORRECTION

PATENT NO. : 4,812,900

DATED : March 14, 1989

INVENTOR(S) : Kadowaki, et al.

It is certified that error appears in the above-identified patent and that said Letters Patent is hereby corrected as shown below:

COLUMN 2
Line 2, delete "an";
Line 11, change "It is another object" to --According to one aspect--, and change "provided" to --is provided--;
Line 48, change "read LED 2," to --red LED 2,--; and
Line 60, change "arrays 10," to --arrays 9 and 10,--.

COLUMN 3
Line 32, change "reference with" to --with reference to--;
Line 33, change "light" to --light, to--; and
Line 35, change "illumination" to --illumination,--.

COLUMN 4
Line 9, delete "as" (both occurrences);

turns on--; and
Line 51, change "rad LED" to --red LED--.

Signed and Sealed this

Twentieth Day of February, 1990

Attest:

JEFFREY M. SAMUELS

*Attesting Officer*  *Acting Commissioner of Patents and Trademarks*